US012666186B1

(12) United States Patent
Kumar

(10) Patent No.: US 12,666,186 B1
(45) Date of Patent: Jun. 23, 2026

(54) HEADPHONE SYSTEM FOR HEARING SAFETY AND AMBIENT AWARENESS

(71) Applicant: Kiran Kumar, Northville, MI (US)

(72) Inventor: Kiran Kumar, Northville, MI (US)

( * ) Notice: Subject to any disclaimer, the term of this patent is extended or adjusted under 35 U.S.C. 154(b) by 0 days.

(21) Appl. No.: 19/313,454

(22) Filed: Aug. 28, 2025

Related U.S. Application Data

(63) Continuation-in-part of application No. 19/254,869, filed on Jun. 30, 2025.

(60) Provisional application No. 63/807,751, filed on May 18, 2025.

(51) Int. Cl.
*H04R 25/00* (2006.01)
*H04R 1/02* (2006.01)
*H04R 1/10* (2006.01)
*H04R 1/32* (2006.01)

(52) U.S. Cl.
CPC ............ *H04R 1/1008* (2013.01); *H04R 1/02* (2013.01); *H04R 1/323* (2013.01)

(58) Field of Classification Search
CPC ..... H04R 1/1066; H04R 1/1008; H04R 1/105
USPC .......................................................... 381/376
See application file for complete search history.

(56) References Cited

U.S. PATENT DOCUMENTS

| | | | |
|---|---|---|---|
| 3,272,926 | A | 9/1966 | Falkenberg |
| 3,488,457 | A | 1/1970 | Lahti |
| 6,305,026 | B1 | 10/2001 | Mo |
| 6,629,579 | B1 | 10/2003 | Hasegawa |
| 6,724,906 | B2 | 4/2004 | Naksen et al. |
| 8,050,444 | B2 | 11/2011 | Smith |
| 8,761,431 | B1 | 6/2014 | Jackson |
| 9,532,130 | B2 | 12/2016 | Fargeau et al. |
| 2014/0369541 | A1 | 12/2014 | Miskin et al. |
| 2015/0222980 | A1 | 8/2015 | Pizzaro et al. |
| 2016/0127819 | A1 | 5/2016 | Shiomi et al. |
| 2017/0195780 | A1 | 7/2017 | Hsiao et al. |
| 2018/0041827 | A1 | 2/2018 | Abdelmalek |
| 2019/0373351 | A1 | 12/2019 | Han |
| 2020/0029151 | A1 | 1/2020 | Cole |
| 2020/0358987 | A1 | 11/2020 | Ross |

FOREIGN PATENT DOCUMENTS

| | | | |
|---|---|---|---|
| EP | 3244629 | A1 | 11/2017 |
| KR | 10-2008-0058157 | A | 6/2008 |
| WO | 2010/008829 | A1 | 1/2010 |

*Primary Examiner* — Phylesha Dabney

(57) ABSTRACT

A headphone system configured to deliver personal audio while preserving ambient awareness. The system includes a support worn on a user's head and at least one speaker module positioned spaced from the user's ear to maintain an open acoustic path for environmental sound. In some embodiments, a headband with a top portion and first and second arms secures the device, with supports having free ends that carry respective speaker modules. The modules may be oriented along the ear's line of hearing, may be spaced about 1-5 cm from the ear, and may include swivel joints to adjust orientation. Implementations may comprise two speaker modules and integration with a helmet in which the headband may be integrated and supports may attach. The system delivers audio while maintaining situational awareness and supporting hearing safety.

14 Claims, 15 Drawing Sheets

HEADPHONE SYSTEM FOR HEARING SAFETY AND AMBIENT AWARENESS

RELATED APPLICATIONS

This application is a continuation-in-part of U.S. application Ser. No. 19/254,869, filed on Jun. 30, 2025 to Kiran Kumar, titled "Adjustable Headphone System for Hearing Safety and Ambient Awareness," which application claims the benefit of U.S. provisional patent application 63/807,751, filed May 18, 2025 to Kiran Kumar, titled "Offset-Position Adjustable Headphone System for Hearing Safety and Ambient Awareness," the entirety of the disclosures of which are hereby incorporated by this reference.

TECHNICAL FIELD

This document relates to a headphone system for hearing safety and ambient awareness.

BACKGROUND

Headphones and earphones are widely used for personal audio playback in a variety of environments, including public spaces, workplaces, and during physical activity. Most conventional designs position speaker elements directly adjacent to or within the user's ears to provide immersive sound delivery. While effective for audio playback, this configuration blocks ambient sounds, limiting the user's awareness of their surroundings. This can pose safety risks in environments where situational awareness is important, such as while walking through congested, high-traffic areas, working in industrial settings, caring for children, or exercising outdoors. To address this, some audio systems incorporate electronic transparency features that use microphones and signal processing to magnify ambient sounds. However, these systems can be technically complex, cost-prohibitive, and may introduce undesirable latency or audio artifacts.

In addition to limiting situational awareness, conventional headphone use may also raise health risks, including contribution to noise-induced hearing loss. Prolonged exposure to high-volume audio or sustained direct sound pressure on the ear can lead to overexposure, which is a known risk factor for noise-induced hearing loss. This risk is particularly pronounced in environments where headphones are worn for extended periods, and users may be unaware of the cumulative effects.

SUMMARY

According to some embodiments, a headphone system comprises a headband configured to be worn on a head of a user, the headband comprising a top portion configured to extend around a crown region of the user's head, the top portion having a first end and a second end opposite the first end, and a first arm extending from the first end and a second arm extending from the second end, the first arm and the second arm together being configured to secure the headband to the user's head, a first support attached to the first arm and a second support attached to the second arm, each support comprising a free end distal to the respective arm, and a first speaker module mounted to the free end of the first support and a second speaker module mounted to the free end of the second support, wherein, when the headband is worn by the user, each speaker module is spaced apart from the user's ear and is configured to deliver audio to the user while allowing ambient sound to reach the user's ear through an open acoustic path.

Particular embodiments may comprise one or more of the following features. Each speaker module may be positioned to project sound along a directional axis that is substantially aligned with the user's line of hearing. Each speaker module may be spaced between 1 centimeter and 5 centimeters from the user's ear. Each speaker module may have a swivel joint configured to enable adjustment of an orientation of the speaker module. The headphone system may comprise a helmet configured to protect the user's head from an impact, wherein the headband is integrated into the helmet and each support is attached to the helmet.

According to some embodiments, a headphone system comprises a headband configured to be worn on a head of a user, the headband having a first arm and a second arm opposite the first arm, the first arm and the second arm together being configured to secure the headband to the user's head, a first support coupled to the first arm and a second support coupled to the second arm, and a first speaker module supported by the first support and a second speaker module supported by the second support, wherein, when the headband is worn by the user, each speaker module is spaced apart from the user's ear and is configured to deliver audio to the user while allowing ambient sound to reach the user's ear through an open acoustic path.

Particular embodiments may comprise one or more of the following features. The first support may comprise a free end distal to the first arm and the second support may comprise a free end distal to the second arm. The first speaker module may be positioned on the free end of the first support and the second speaker module may be positioned on the free end of the second support. Each speaker module may be positioned to project sound along a directional axis that is substantially aligned with the user's line of hearing. Each speaker module may be spaced between 1 centimeter and 5 centimeters from the user's ear. Each speaker module may have a swivel joint configured to enable adjustment of an orientation of the speaker module. The headphone system may comprise a helmet configured to protect the user's head from an impact, wherein the headband is integrated into the helmet and each support is attached to the helmet.

According to some embodiments, a headphone system comprises a support configured to be worn on a head of a user, and a speaker module positioned on the support, wherein, when the support is worn by the user, the speaker module is spaced apart from the user's ear, and wherein the speaker module is configured to deliver audio to the user while allowing ambient sound to reach the user's ear through an open acoustic path.

Particular embodiments may comprise one or more of the following features. The speaker module may be positioned to project sound along a directional axis that is substantially aligned with the user's line of hearing. The speaker module may be spaced between 1 centimeter and 5 centimeters from the user's ear. The headphone system may further comprise a headband configured to be worn on the head of the user, wherein the support is attached to the headband. The support may comprise a free end distal to the headband. The speaker module may be positioned on the free end of the support. The speaker module may have an adjustable orientation with respect to the headband. The headphone system may comprise a helmet configured to protect the user's head from an impact, wherein the support is attached to the helmet.

The present disclosure is related to an adjustable headphone system, comprising a headband configured to be worn on a head of a user, the headband comprising a top portion configured to extend around a crown region of the user's head, the top portion having a first end and a second end opposite the first end, and a first arm extending from the first end and a second arm extending from the second end, the first arm and the second arm together being configured to secure the headband to the user's head, a first mechanical linkage rotatably coupled to the first arm and a second mechanical linkage rotatably coupled to the second arm, each mechanical linkage comprising a hinged end coupled to the respective arm, and a free end distal to the hinged end, and a first speaker module mounted to the free end of the first mechanical linkage and a second speaker module mounted to the free end of the second mechanical linkage, wherein, when the headband is worn by the user, each speaker module is adjustable between a proximate position in which the speaker module is positioned adjacent to the user's ear, and an offset position in which the speaker module is spaced apart from the user's ear, and wherein, in the offset position, each speaker module is configured to deliver audio to the user while allowing ambient sound to reach the user's ear through an open acoustic path.

Particular embodiments may comprise one or more of the following features. The offset position of each speaker module may comprise a plurality of discrete positions. Each speaker module may be configured to click into each of the plurality of discrete positions. Each speaker module may be continuously adjustable between the proximate position and the offset position. When in the offset position, the speaker module may be spaced between 1 centimeter and 5 centimeters from the user's ear. Each speaker module may have a swivel joint configured to enable adjustment of an orientation of the speaker module when in the offset position.

The present disclosure is related to an adjustable headphone system, comprising a headband configured to be worn on a head of a user, the headband having a first arm and a second arm opposite the first arm, the first arm and the second arm together being configured to secure the headband to the user's head, a first mechanical linkage coupled to the first arm and a second mechanical linkage coupled to the second arm, and a first speaker module supported by the first mechanical linkage and a second speaker module supported by the second mechanical linkage, wherein, when the headband is worn by the user, each speaker module is adjustable between a proximate position in which the speaker module is positioned adjacent to the user's ear, and an offset position in which the speaker module is spaced apart from the user's ear, and wherein, in the offset position, each speaker module is configured to deliver audio to the user while allowing ambient sound to reach the user's ear through an open acoustic path.

Particular embodiments may comprise one or more of the following features. Each of the first mechanical linkage and the second mechanical linkage may be rotatably coupled to the headband. Each mechanical linkage may comprise a hinged end coupled to the respective arm and a free end distal to the hinged end and wherein the first speaker module is attached to the free end of the first mechanical linkage and the second speaker module is attached to the free end of the second mechanical linkage. The offset position of each speaker module may comprise a plurality of discrete positions. Each speaker module may be configured to click into each of the plurality of discrete positions. Each speaker module may be continuously adjustable between the proximate position and the offset position. When in the offset position, the speaker module may be spaced between 1 centimeter and 5 centimeters from the user's ear. Each speaker module may have a swivel joint configured to enable adjustment of an orientation of the speaker module when in the offset position.

The present disclosure is related to an adjustable headphone system, comprising a headband configured to be worn on a head of a user, and a first speaker module and a second speaker module each supported by the headband, wherein, when the headband is worn by the user, each speaker module is adjustable between a proximate position in which the speaker module is positioned adjacent to the user's ear, and an offset position in which the speaker module is spaced apart from the user's ear, and wherein, in the offset position, each speaker module is configured to deliver audio to the user while allowing ambient sound to reach the user's ear through an open acoustic path.

Particular embodiments may comprise one or more of the following features. The offset position of each speaker module may comprise a plurality of discrete positions. Each speaker module may be configured to click into each of the plurality of discrete positions. Each speaker module may be continuously adjustable between the proximate position and the offset position. When in the offset position, the speaker module may be spaced between 1 centimeter and 5 centimeters from the user's ear. Each speaker module may have an adjustable orientation with respect to the headband.

The foregoing and other aspects, features, and advantages will be apparent from the DESCRIPTION and DRAWINGS, and from the CLAIMS.

BRIEF DESCRIPTION OF THE DRAWINGS

Implementations will hereinafter be described in conjunction with the appended and/or included DRAWINGS, where like designations denote like elements.

DETAILED DESCRIPTION

Figure 1:
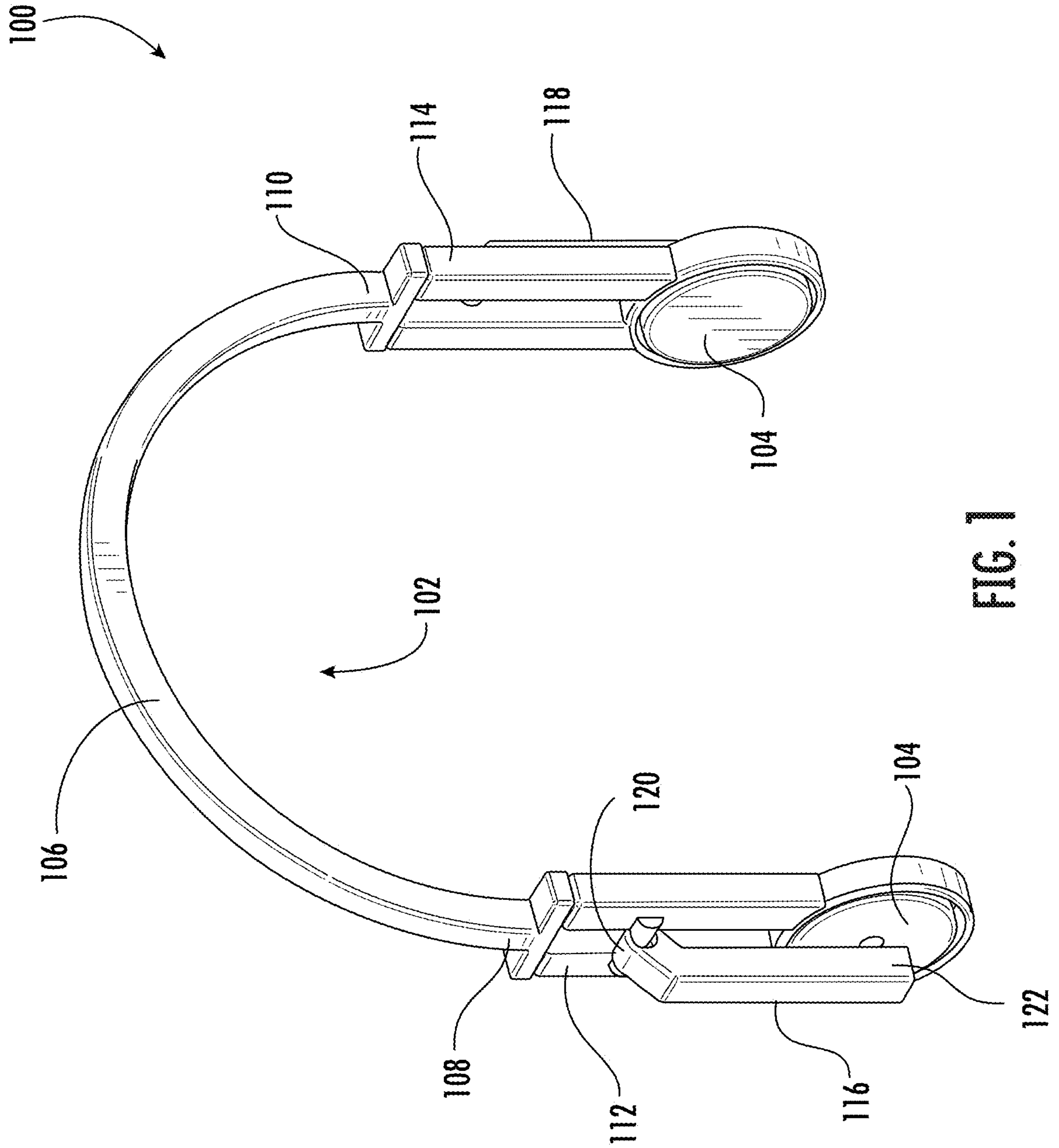
FIG. 1 is a perspective view of an adjustable headphone system according to some embodiments.

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity and clarity in illustrating the principle and spirit of the present disclosure.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the present disclosure that may be embodied in various forms. Therefore, specific structural and functional details disclosed herein are not to be interpreted as limits, but merely as a basis for teaching one skilled in the art to employ the principles of the present disclosure. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed subject matter. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure relates to a mechanically configurable headphone system that enables users to reposition speaker modules laterally relative to their ears, thereby providing both effective audio delivery and improved ambient sound awareness. Unlike systems that rely on electronic transparency features such as microphones and signal processing, the presently disclosed headphone system achieves this functionality through physical adjustment of the speaker modules (or "drivers" as speaker modules are sometimes called in the literature). This mechanical adjustability supports a customizable listening experience that can be adapted to a variety of user environments and situational needs.

By enabling speaker modules to move between a proximate position, where the speaker is positioned adjacent to the user's ears for immersive listening, and an offset position, where the speaker is spaced apart from the ear to preserve an open acoustic path to the ear, the system offers a practical and ergonomic solution for enhancing situational awareness without sacrificing audio functionality. Moreover, by reducing or eliminating direct sound pressure on the ear in the offset position, the system may help mitigate the risk of overexposure to sound, thereby supporting long-term hearing health and reducing the likelihood of hearing loss from high sound-pressure levels. This dual-mode configuration allows users to dynamically adapt the headphone system to changing environments and listening needs. The detailed embodiments below illustrate various configurations and features that support this dual-mode operation.

The present disclosure relates to an adjustable headphone system 100, representative embodiments of which are illustrated in FIGS. 1-4. The adjustable headphone system 100 comprises a headband 102, which is configured to be worn on a head of a user. For example, when worn, the headband 102 may extend over the top of the user's head or wrap around the back of the user's head.

The adjustable headphone system 100 also comprises at least one speaker module 104. The speaker module 104 is configured to deliver audio to the user's ear. In some embodiments, the headphone system 100 comprises two speaker modules 104, one for each ear, designated as a first speaker module and a second speaker module. Each speaker module 104 is supported by the headband 102 and is positioned to be near one of the user's ears when the headband 102 is worn.

Figure 2:
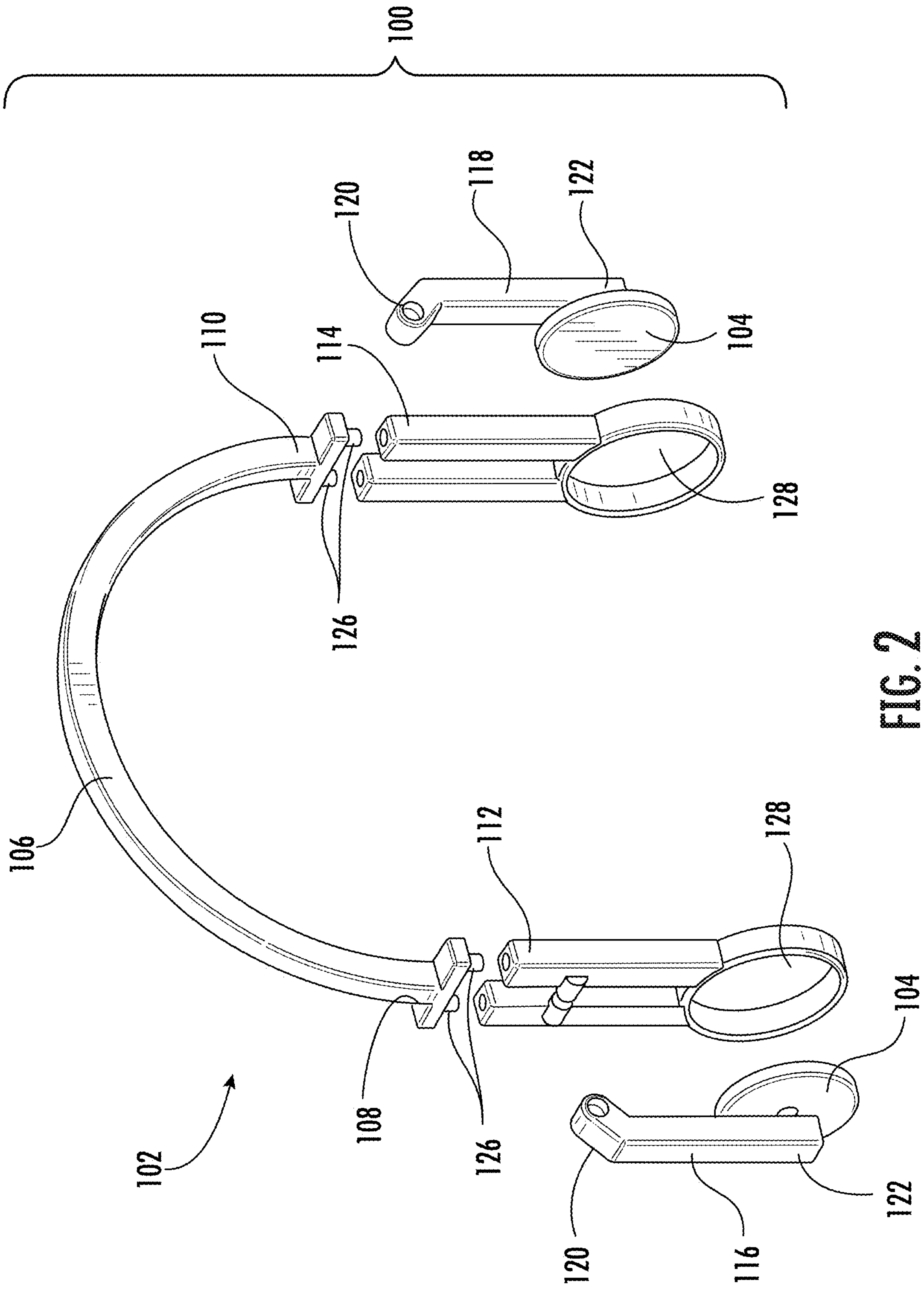
FIG. 2 is an exploded view of an adjustable headphone system according to some embodiments.

In some embodiments, as shown in FIGS. 1-2, the headband 102 comprises a top portion 106 that is configured to rest on or wrap around a crown region of the user's head. The top portion 106 may or may not make contact with the crown region of the user's head. The top portion 106 has a first end 108 and a second end 110 opposite the first end 108. A first arm 112 extends from the first end 108 and a second arm 114 extends from the second end 110. The first arm 112 and the second arm 114 may be formed integrally with the top portion 106 or may be separate components that are joined, coupled, or otherwise attached. In some embodiments, the first arm 112 and the second arm 114 are adjustably coupled to the top portion 106 to allow the headband 102 to be resized to fit different head shapes and sizes. For example, the first arm 112 and the second arm 114 may be slidably engaged with the top portion 106 enabling vertical adjustment along the user's head to optimize positioning.

In some embodiments, the adjustable headphone system 100 comprises a first mechanical linkage 116 and a second mechanical linkage 118. Each mechanical linkage may include the same structural components and functionality, differing only in whether it is coupled to the first arm 112 or the second arm 114. Specifically, the first mechanical linkage 116 is coupled to the first arm 112 and the second mechanical linkage 118 is coupled to the second arm 114.

In some embodiments, the first mechanical linkage 116 and the second mechanical linkage 118 are rotatably coupled to the first arm 112 and the second arm 114, respectively. In some embodiments, the first mechanical linkage 116 and the second mechanical linkage 118 are slidably coupled to the first arm 112 and the second arm 114, respectively. These coupling configuration (rotatably, slidably, etc.) may be implemented individually or in combination, depending on the desired range of motion. More generally, the first mechanical linkage 116 and the second mechanical linkage 118 may be configured to couple to its respective arm using any suitable mechanism known in the art, provided that the coupling imparts at least one degree of freedom between each mechanical linkage and its respective arm. This mechanical freedom enables positional adjustability of the speaker modules 104, as described in more detail below.

In embodiments where the first mechanical linkage 116 and the second mechanical linkage 118 are rotatably coupled to the first arm 112 and the second arm 114, respectively, each mechanical linkage may comprise a hinged end 120 and free end 122. The hinged end 120 is coupled to the respective arm of the mechanical linkage and the free end 122 is positioned distal to the hinged end. Accordingly, rotation of either mechanical linkage relative to its respective arm causes the free end 122 to move toward or away from the arm, thereby enabling lateral positional adjustment of the attached speaker module 104.

In some embodiments, the speaker modules 104 are supported by the first mechanical linkage 116 and the second mechanical linkage 118. Each speaker module 104 may be mounted to, positioned on, attached to, or otherwise supported by its respective mechanical linkage. In some embodiments, each of the speaker modules 104 is mounted to or positioned on the free end 122 of one of the first mechanical linkage 116 and the second mechanical linkage 118. Thus, when the mechanical linkages are rotated or moved relative to the headband 102, the speaker modules 104 move as well, enabling positional adjustment and making the speaker modules 104 adjustable. Depending on the embodiment, the mechanical linkages may include linear couplings, telescoping arms, or flexible members that allow the speaker modules 104 to be repositioned in a variety of ways.

Figure 3:
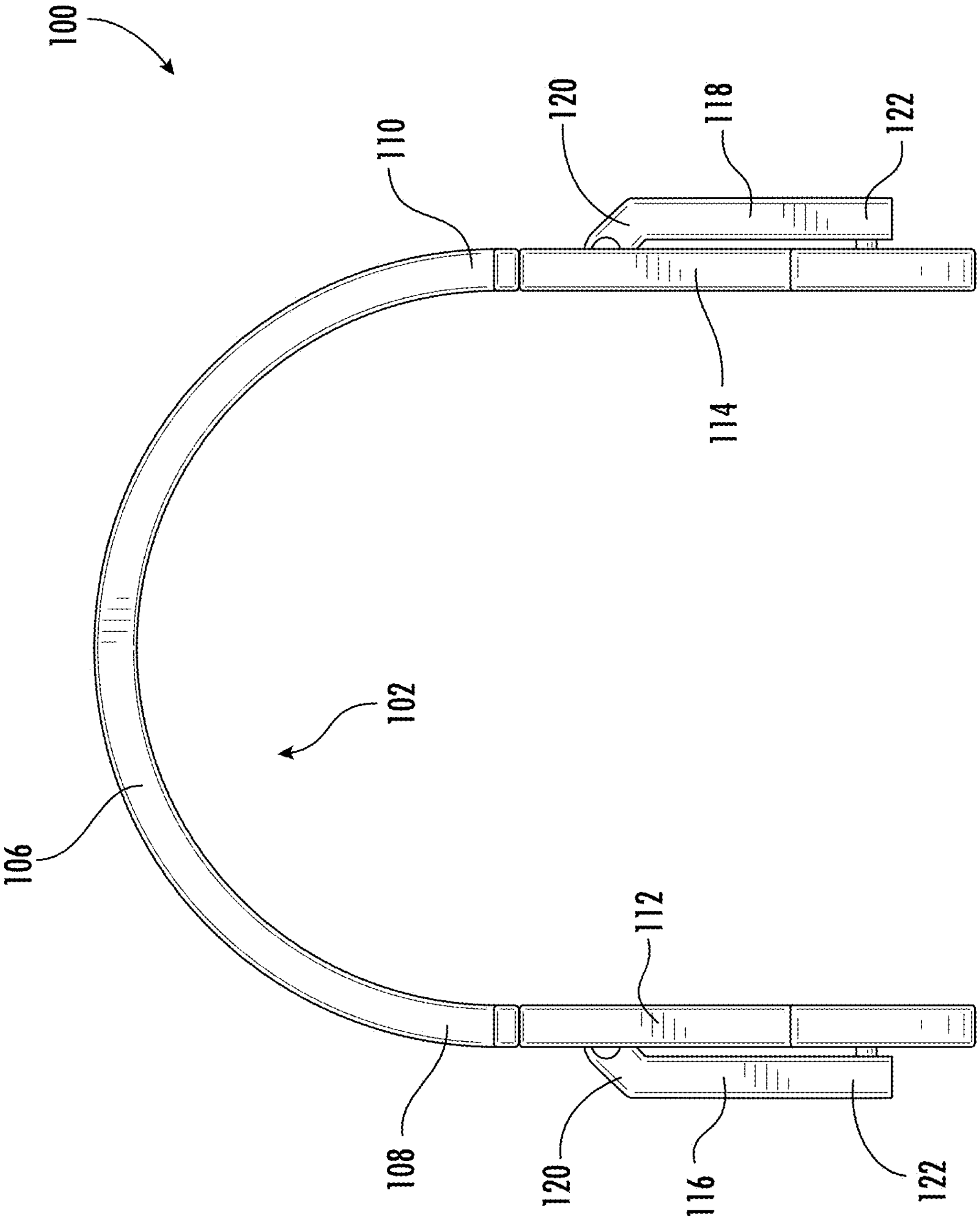
FIG. 3 is a front view of an adjustable headphone system with the speaker modules in the proximate position according to some embodiments.
Figure 4:
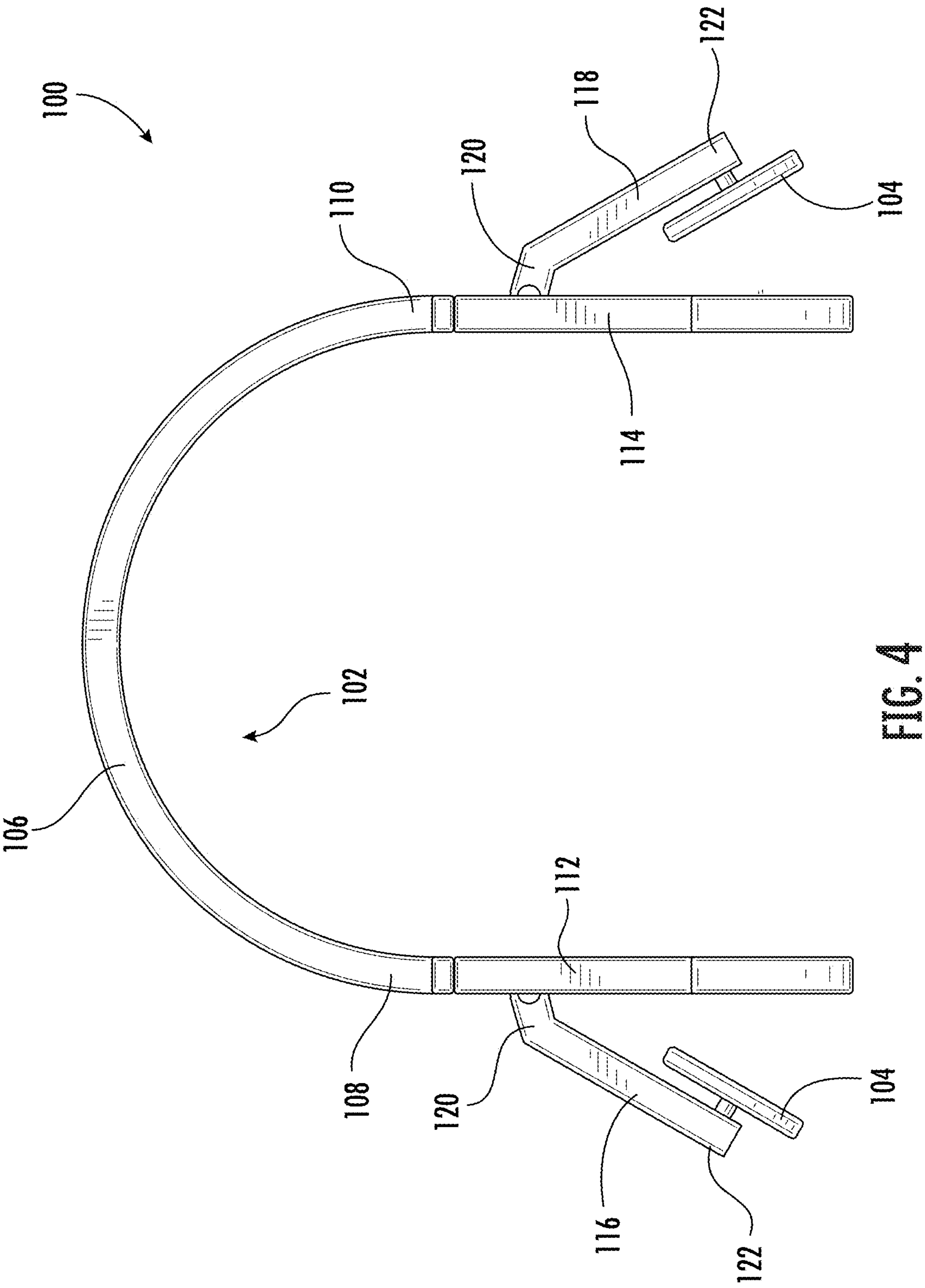
FIG. 4 is a front view of an adjustable headphone system with the speaker modules in the offset position according to some embodiments.
Figure 6:
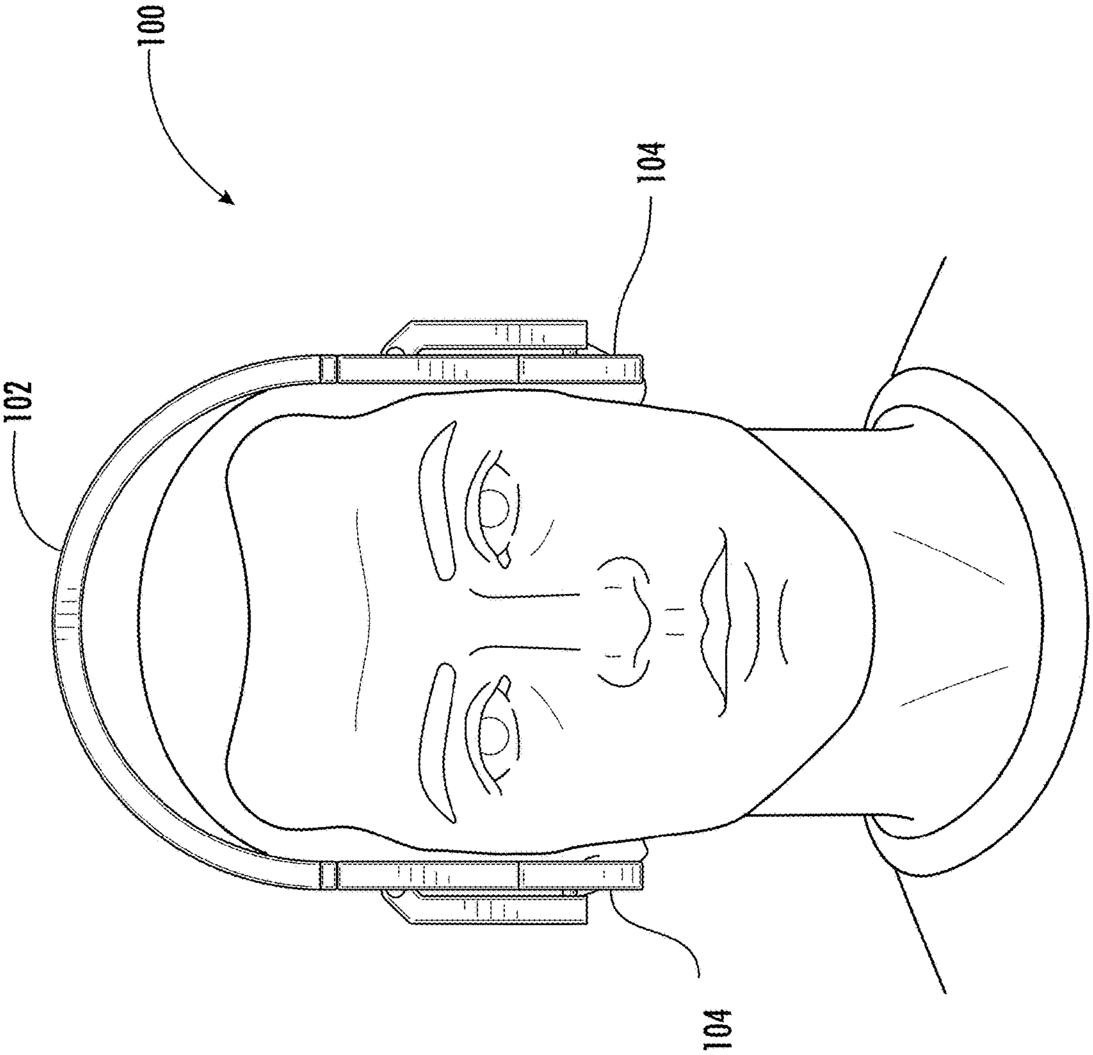
FIG. 6 is a front view of an adjustable headphone system worn by a user with the speaker modules in the proximate position according to some embodiments.
Figure 7:
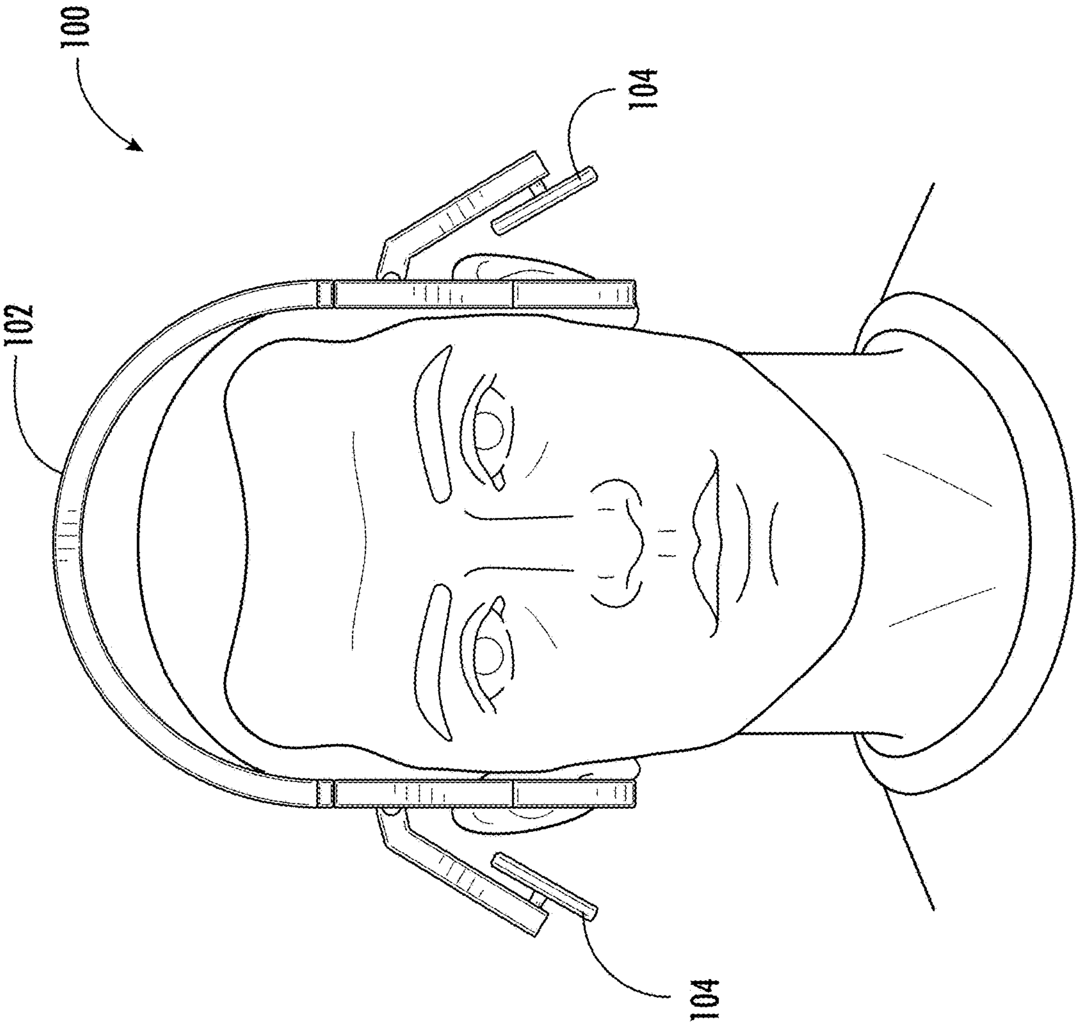
FIG. 7 is a front view of an adjustable headphone system worn by a user with the speaker modules in the offset position according to some embodiments.
Figure 8:
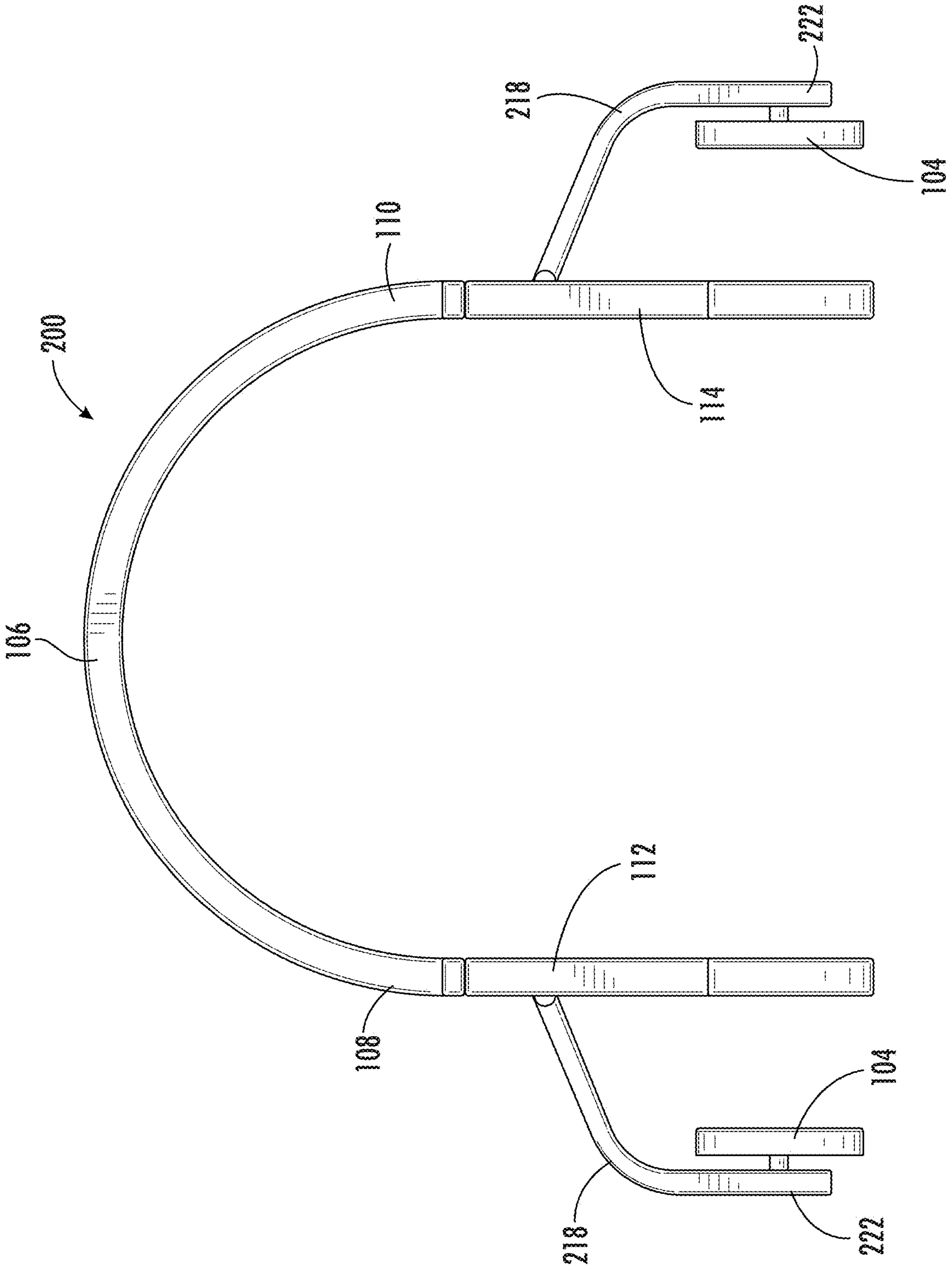
FIG. 8 is a front view of a headphone system according to some embodiments.
Figure 9:
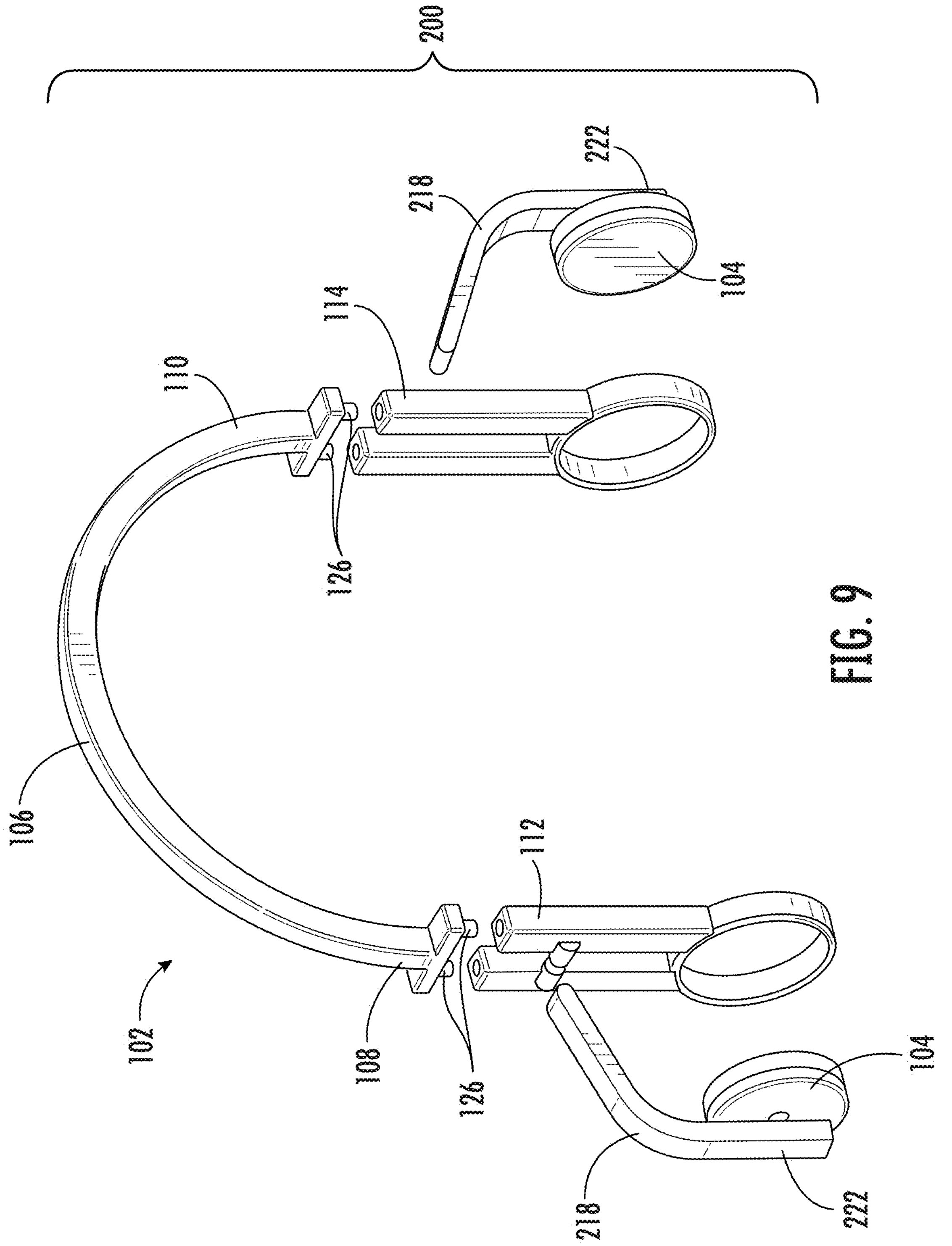
FIG. 9 is an exploded view of a headphone system according to some embodiments.
Figure 10:
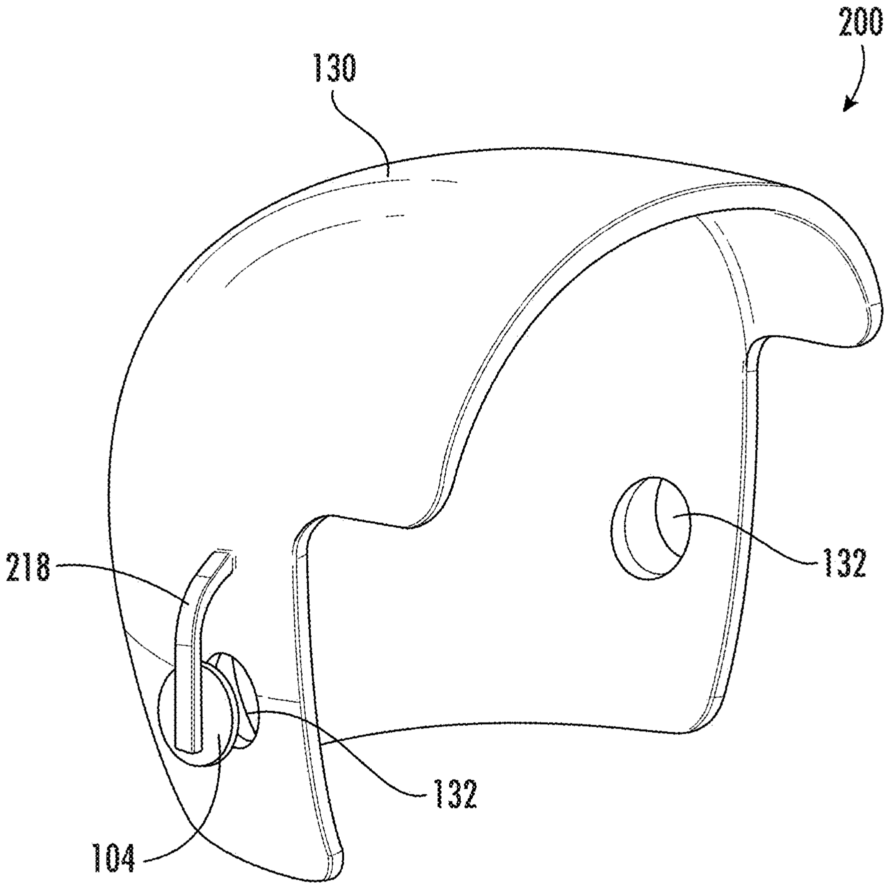
FIG. 10 is a top perspective view of a headphone system according to some embodiments.
Figure 11:
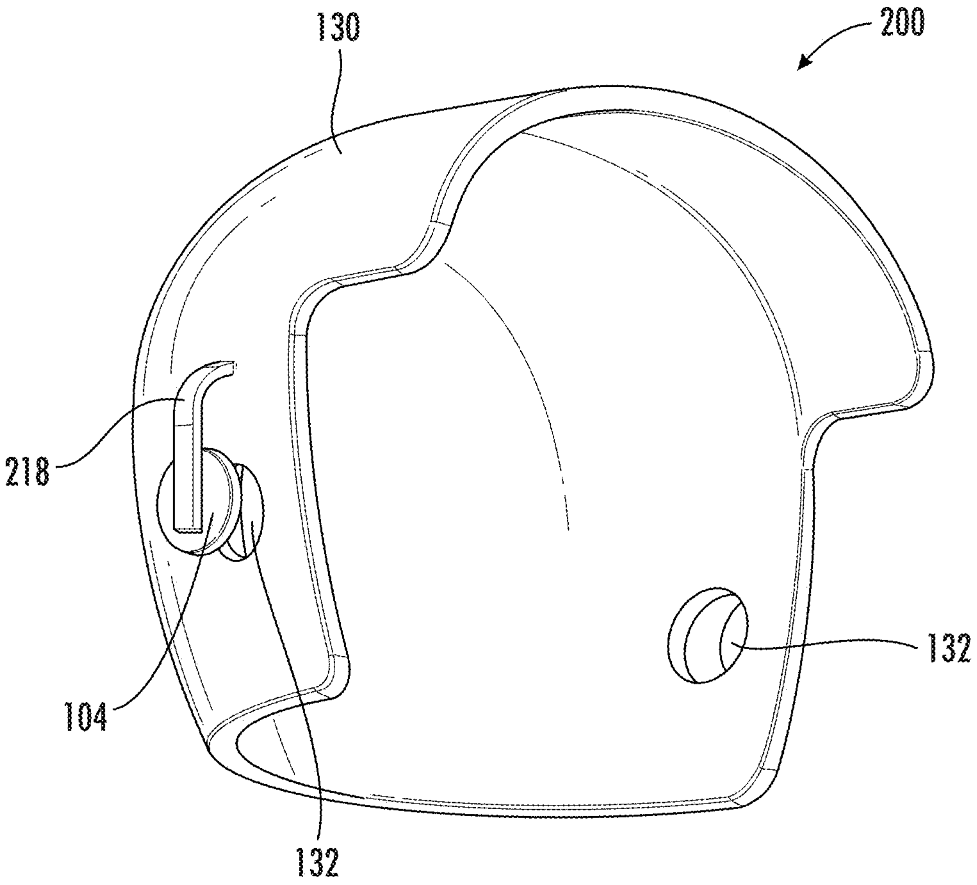
FIG. 11 is a bottom side perspective view of a headphone system according to some embodiments.
Figure 12:
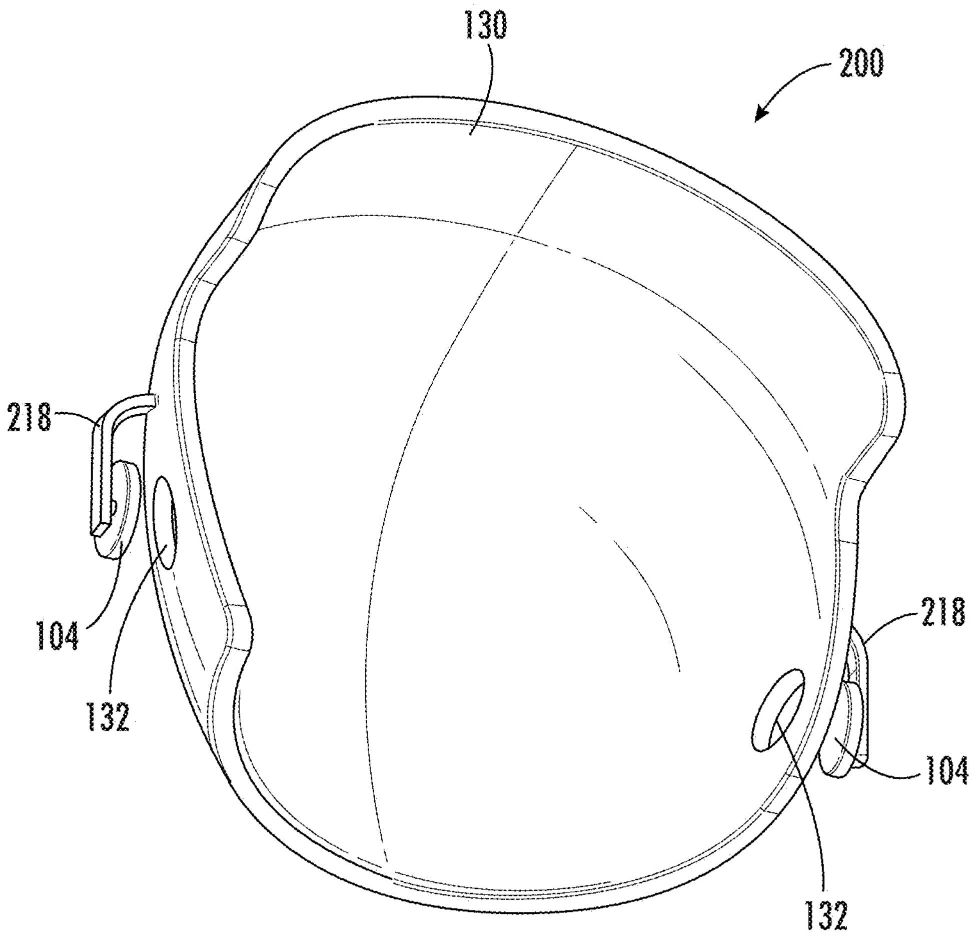
FIG. 12 is a bottom perspective view of a headphone system according to some embodiments.
Figure 13:
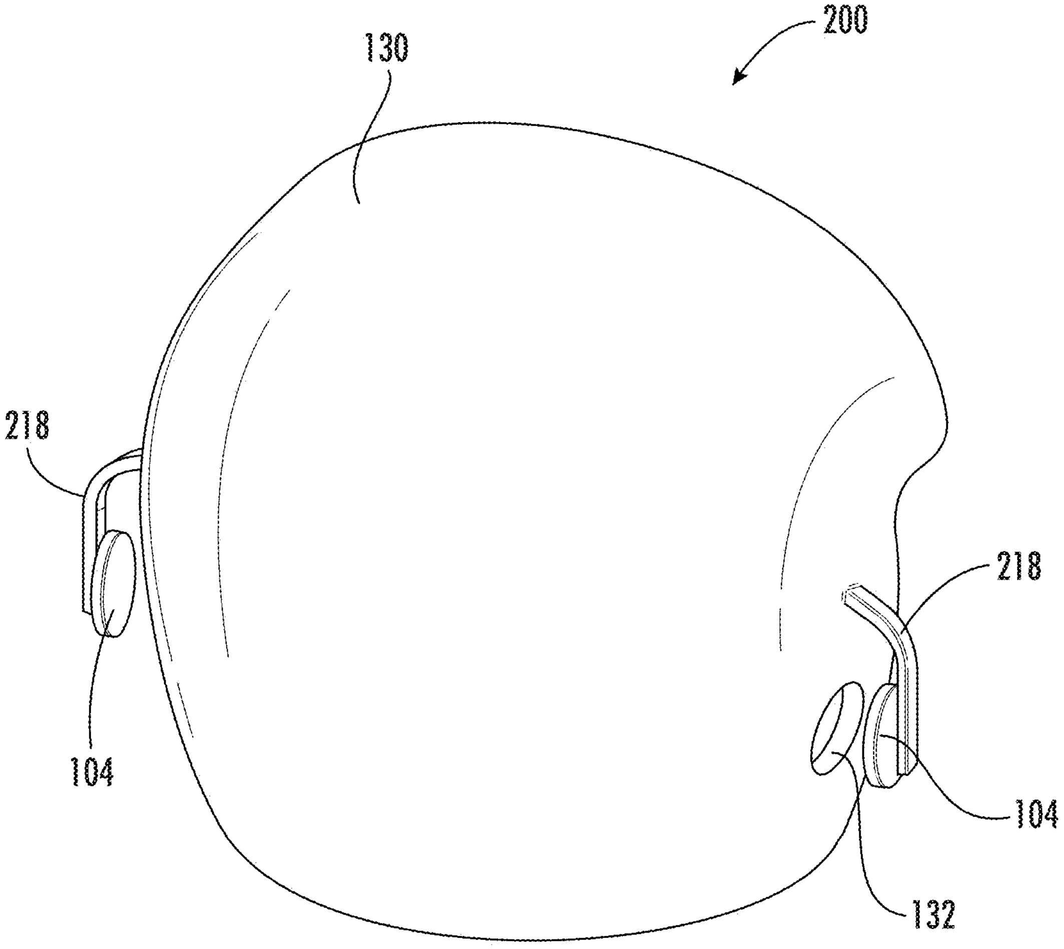
FIG. 13 is a rear perspective view of a headphone system according to some embodiments.
Figure 14:
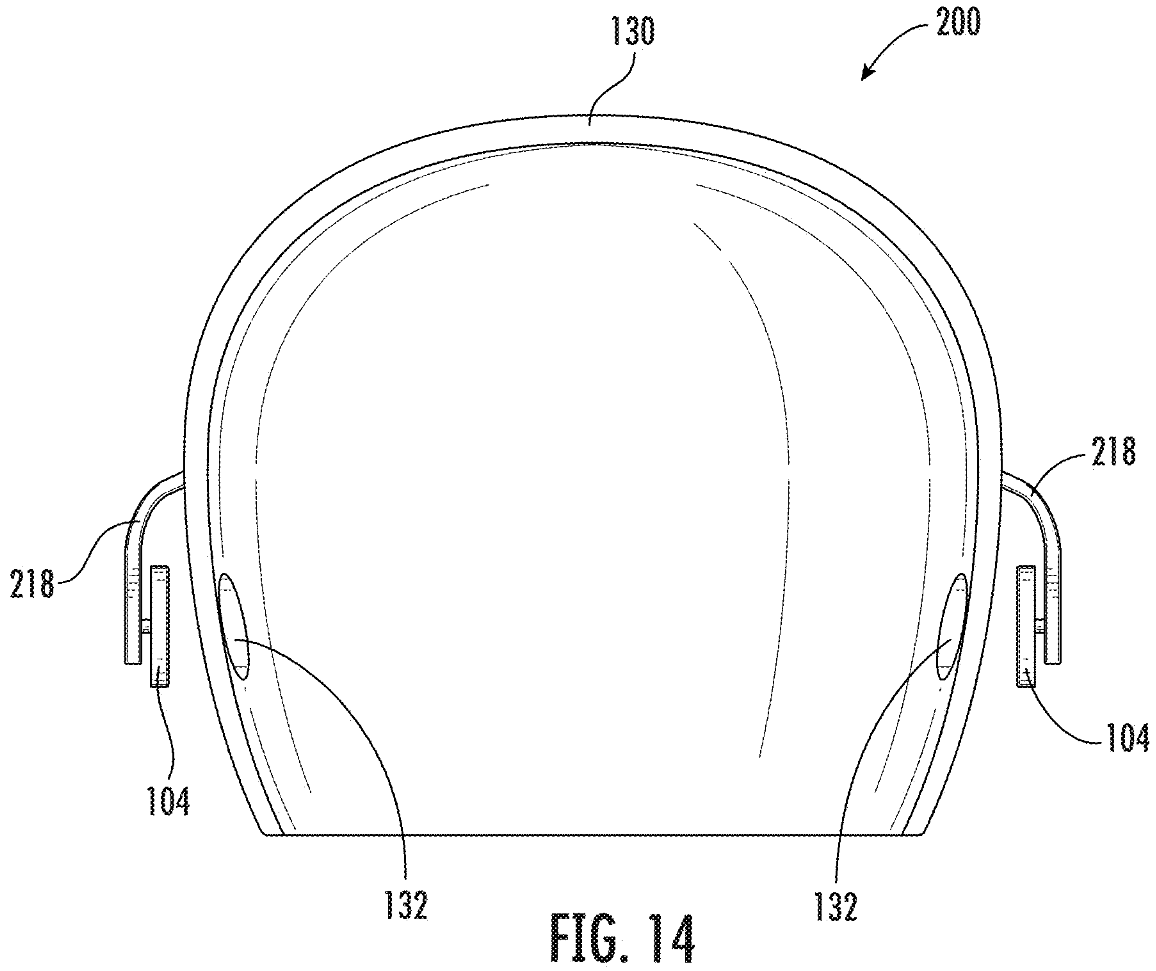
FIG. 14 is a front view of a headphone system according to some embodiments.
Figure 15:
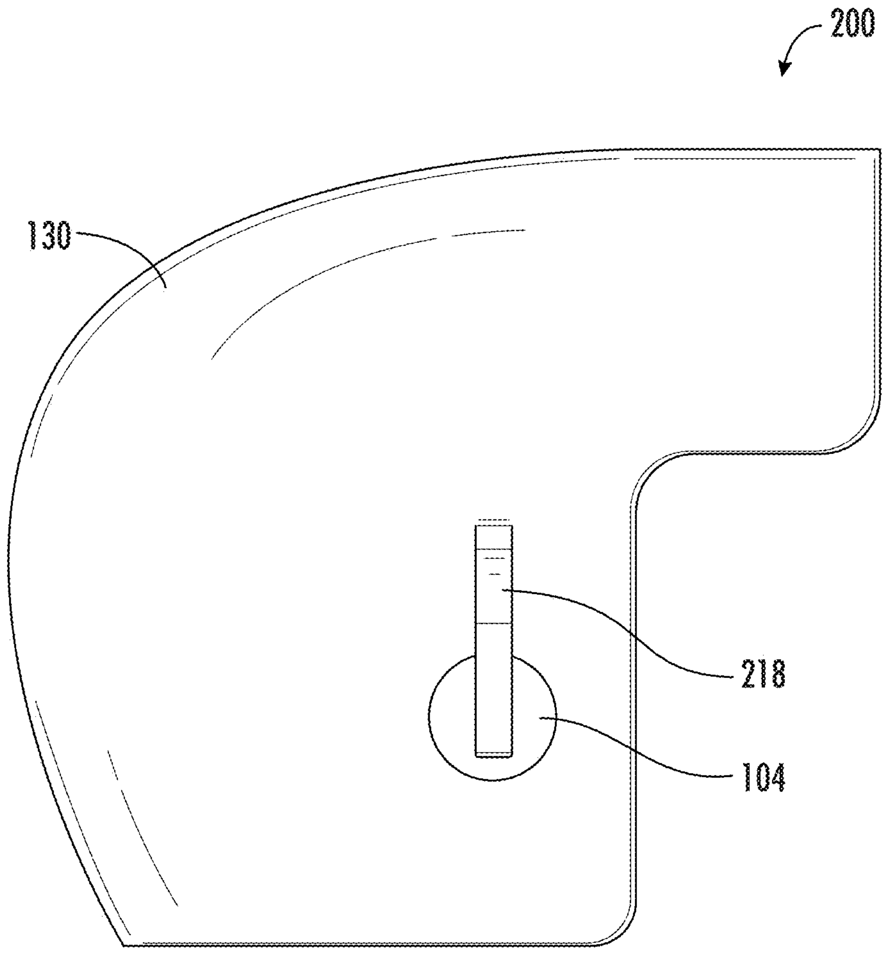
FIG. 15 is a side view of a headphone system according to some embodiments.

In some embodiments, when the headband 102 is worn by the user, each speaker module 104 is adjustable between a number of defined positions. In some embodiments, each speaker module 104 is adjustable between a proximate position, in which the speaker is positioned adjacent to the user's ear for immersive audio delivery as shown in FIGS. 3 and 6, and an offset position, in which the speaker is spaced apart from the ear as shown in FIGS. 4 and 7. Thus, when in the proximate position, the speaker module 104 is positioned adjacent to the user's ear, similar to conventional headphones. As explained above, such a position is useful for audio delivery, but in many cases at least partially physically blocks ambient sound from reaching the user's ear and interferes with environmental awareness.

In contrast, the offset position creates a physical separation between the speaker module 104 and the user's ear, as shown in FIG. 7, forming an open acoustic path. The open acoustic path is a path from the surroundings of the user into their ear that is unobstructed and free of obstacles. In other words, the offset position is a physical configuration of the adjustable headphone system 100 in which ambient sound waves can travel to the user's ear without being blocked or significantly attenuated by the structure of the adjustable headphone system 100. This open acoustic path is a distinguishing feature of the adjustable headphone system 100, allowing the user to remain aware of their surroundings while still receiving audio playback. Conventional headphones either insert into the ear canal, thereby blocking the acoustic path, or cup the ear and rest against the head, similarly obstructing ambient sound, and thus do not have open acoustic paths.

In some embodiments, the speaker modules 104 may be repositioned using any adjustment mechanism known in the art. For example, the speaker modules 104 may be configured with a spring-loaded detent mechanism similar to that used in retractable pens, where pressing the speaker module 104 causes the speaker module 104 to move and lock into the offset position, and pressing again causes the speaker module 104 to retract and lock into the proximate position. Alternatively, the speaker modules 104 may be manually repositioned by the user through direct manipulation, with the position held in place by friction, a ratcheting hinge, or a click-stop mechanism. Other implementations may include magnetic latching systems, cam-based linkages, or sliding tracks with detents or stops. These and other mechanical configurations may be used to provide tactile feedback, secure positioning, and intuitive operation, depending on the desired user experience and manufacturing constraints. In some embodiments, the speaker modules 104 may be adjusted between the proximate position and the offset position without physically moving the speaker modules 104 themselves. For example, the speaker modules 104 may have extensions that move toward or away from the user's head to cut off or open up the open acoustic path without moving the speaker modules 104 themselves. In such an embodiment, when the acoustic path is blocked, the speaker module 104 is in the proximate position, and when the acoustic path is open, the speaker module 104 is in the offset position, despite the fact that the speaker module 104 itself has not moved.

Each speaker module 104 is configured to deliver audio to the user even when in the offset position, spaced apart from the ear. In this configuration, the speaker module 104 continues to provide audio playback while allowing ambient sound to reach the user's ear through an open acoustic path. In some embodiments, the adjustable headphone system 100 may be configured to automatically adjust playback volume when a speaker module 104 is moved from the proximate position to the offset position. This automatic compensation accounts for the increased distance between the speaker and the user's ear, helping to maintain consistent perceived audio levels without requiring manual volume adjustment. To enhance sound directionality in the offset position, some embodiments may include an integrated audio baffle or diffuser.

Figure 5:
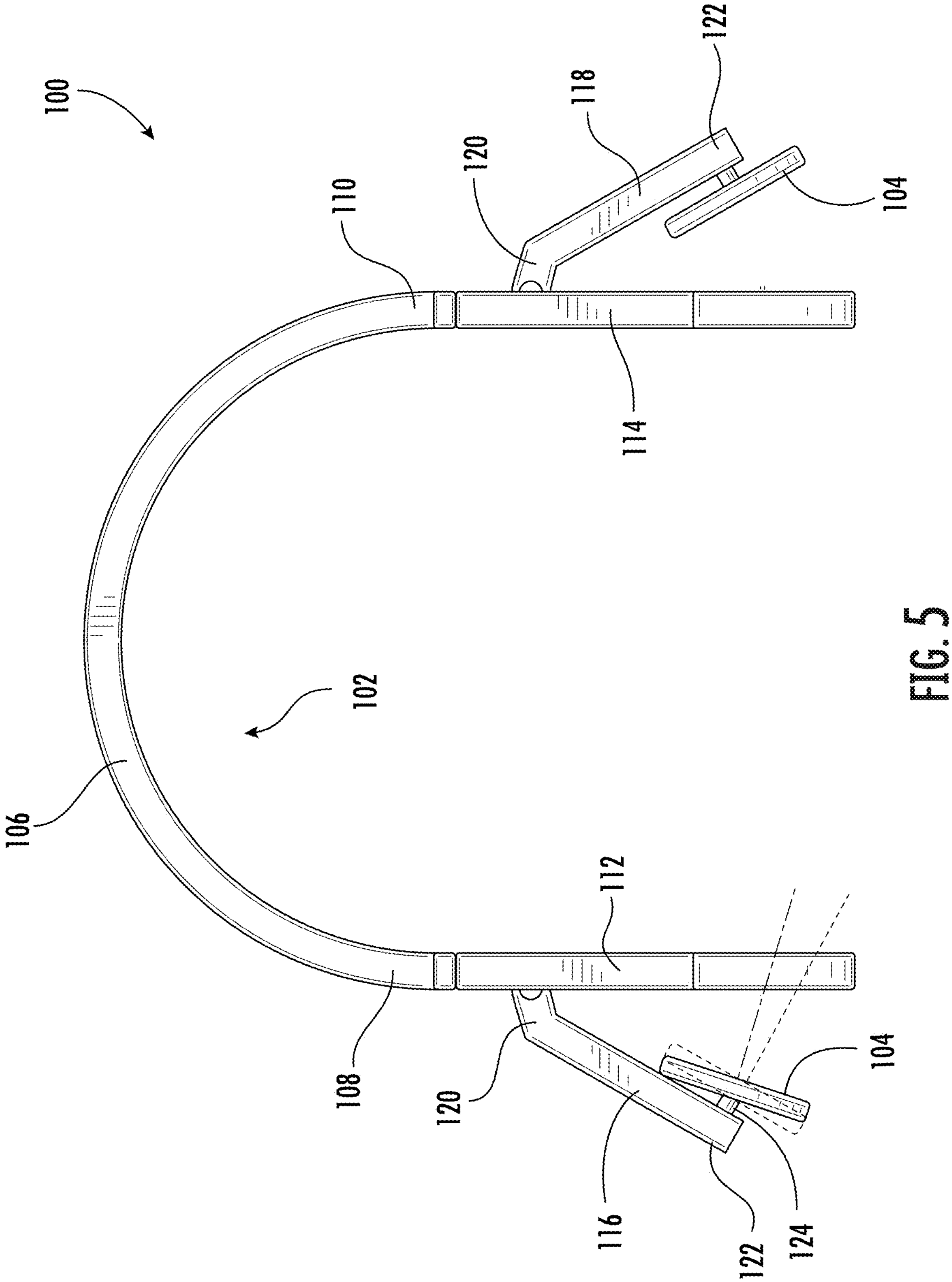
FIG. 5 is a front view of an adjustable headphone system with the speaker module having an adjustable orientation according to some embodiments.

In addition, each speaker module 104 may have an adjustable orientation with respect to the headband 102. As shown in FIG. 5, repositioning a speaker module 104 to the offset position may cause it to point away from the ear, such as downward or otherwise not directly facing the ear. To compensate for this, in some embodiments, the speaker module 104 has an adjustable orientation and may be rotated or reoriented to once again face the ear, thereby maintaining effective audio delivery. This adjustability improves performance in both the proximate and offset positions, allowing the user to compensate for any change in orientation that results from repositioning the speaker modules 104 to the offset position, In some embodiments, each speaker module 104 has a swivel joint 124 that is configured to enable orientation adjustment when in the offset position. The swivel joint 124 may be implemented as a simple hinge, a ball joint or other mechanism that provides one or more degrees of freedom. These may include both rotational and translational movement, allowing the user to fine-tune the speaker's direction for optimal sound projection.

In some embodiments, the headphone system 100 is configured without a proximate position, such that the speaker modules 104 are maintained exclusively in an offset position relative to the user's ears. Thus, the proximate position is not a requirement for all embodiments of the presently disclosed headphone system 100. The speaker modules 104 may be oriented to project sound along a directional axis that is substantially aligned with the user's line of hearing, which is defined herein as the axis extending from the ear canal opening in the direction of the ear canal's longitudinal axis. This alignment improves the ability of the user to perceive audio content with high clarity and intelligibility, despite the physical separation between the speaker module 104 and the user's ear. The directional orientation of the speaker modules 104 along the line of hearing allows for effective sound delivery while preserving the user's ability to remain aurally and perceptually aware of ambient environmental sounds.

In some embodiments, the offset position of each speaker module 104 comprises a plurality of discrete positions. This allows the user to select from multiple predefined distances between the speaker module 104 and the ear, depending on the desired balance between audio delivery and ambient awareness. In some embodiments, each speaker module 104 is configured to click into each of the plurality of discrete positions, such as through the use of a detent mechanism, a click-stop hinge, or another suitable indexing feature. The speaker module 104 may comprise a magnetic positioning mechanism for holding the speaker module 104 at each discrete stop.

In some embodiments, each speaker module 104 is continuously adjustable between the proximate position and the offset position. In such embodiments, the user may manually position the speaker module 104 at any point along the adjustment path and leave it in place. This continuous adjustability may be enabled by a friction-based pivot, a sliding track, or a bendable arm that retains its shape. Frictional resistance within the adjustment mechanism may be sufficient to maintain the selected position during use. In some embodiments, when in the offset position, the speaker module 104 is spaced between 1 centimeter and 5 centimeters from the user's ear, measured from the center of the speaker module 104 to the ear. In embodiments where the first arm 112 and the second arm 114 are positioned over the user's ears when the user wears the adjustable headphone system 100, this distance may correspond to the distance from the center of the speaker module 104 to the inside surface of the respective arm because the user's ear is likely in contact with this inside surface, as shown in FIGS. 6 and 7.

The adjustable headphone system 100 may comprise additional variations beyond those discussed above. For example, in some embodiments, the headband 102 comprises multiple separate components, including a top portion 106, first arm 112, and a second arm 114. These components may be joined using a plurality of connector studs 126, which couple the top portion 106 to the first arm 112 and/or the second arm 114, as shown in FIG. 2.

In some embodiments, the first arm 112 and the second arm 114 comprise speaker holes 128 configured to align with the user's ears and receive the speaker modules 104 when in the proximate position. The edge of each speaker hole 128 may comprise a notch to accommodate a wire for wired headphones, allowing the wire to pass through without interference when the speaker module 104 is seated in the speaker hole 128.

Additional variations of the adjustable headphone system 100, which employ the design of offset adjustability discussed above, may include embodiments designed for single-ear use, designs that wrap behind the user's neck, or foldable structures for compact storage and portability.

The adjustable headphone system 100 offers several advantages. In the offset position, the user may remain aware of their surroundings, which is particularly beneficial in environments such as city streets, public transportation, classrooms, offices, or industrial settings. This enhanced environmental awareness can improve both personal safety and interpersonal communication. Additionally, by reducing direct sound pressure on the ear, the system may help mitigate the risk of hearing loss induced when sound is supplied directly into the ear in an isolated manner which occurs in conventional, always-on-the-ear headphones, particularly during prolonged use. This makes the system well-suited for users who wear headphones for extended periods in professional or recreational settings. The ability to reposition the speaker modules 104 allows users to dynamically adapt the headphone configuration to their environment, seamlessly switching between immersive audio and ambient awareness without removing or replacing the device.

For example, a user commuting on a train may use the proximate position for immersive listening, then switch to the offset position when walking through a busy station to hear announcements and surrounding activity. In an office setting, the offset position may allow the user to remain aware of conversations, alerts or colleagues while listening to music or participating in a call. During outdoor exercise, such as jogging or cycling, the offset position may enable the user to hear approaching vehicles or other environmental cues while still enjoying audio playback.

The present disclosure is related to a headphone system 200, representative embodiments of which are illustrated in FIGS. 8-15. The headphone system 200 may have any combination of the components and features discussed above with respect to the headphone system 100. The headphone system 200 may comprise a headband 102 and/or a speaker module 104, as described above regarding the headphone system 100. In some embodiments of the headphone system 200, the speaker module 104 is positioned on a support 218 that is configured to be worn on the head of the user. In some embodiments, the support 218 is attached to the headband 102. In some embodiments, the support 218 is not supported by a headband 102, and is instead configured to be worn directly on the head of the user, such as on the ear of the user. For example, the support 218 may be implemented as an ear hook or ear clip configured to be worn on the head of the user. Other implementations of the support 218 will be apparent a person of skill in the art.

In some embodiments, the headphone system comprises two speaker modules 104 and two support 218, denoted as the first speaker module 104 and second speaker module, and as the first support 218 and the second support 218. In embodiments with a headband 102, the first support 218 may be attached to the first arm 112 of the headband 102 and the second support 218 may be attached to the second arm 114 of the headband 102. In some embodiments, each support 218 comprises a free end 222 that is distal to the respective arm of that support 218. For example, the first support 218 may have a free end 222 distal to the first arm 112 of the headband 102.

The speaker module 104 may be mounted to the free end 222 of the support 218. In some embodiments, when the headband 102 or the support 218 is worn on the user's head, each speaker module 104 is spaced apart from the user's ear and is configured to deliver audio to the user while allowing ambient sound to reach the user's ear through an open acoustic path, as described above. Each speaker module 104 may be positioned to project sound along a directional axis that is substantially aligned with the user's line of hearing. In some embodiments, each speaker module 104 is spaced between 1 centimeter and 5 centimeters from the user's ear. The speaker module 104 may have an adjustable orientation with respect to the headband 102. This allows for the user to adjust the directionality of the sound projecting from the speaker module 104 to improve alignment with the user's ear, and thus improve the sound quality. In some embodiments, the speaker module 104 has a swivel joint 124 configured to enable this adjustment of the orientation of the speaker module 104.

In some embodiments, including those shown in FIGS. 10-15, the headphone system 200 comprises a helmet 130 configured to protect the user's head from an impact. The headphone system 100 may also comprise a helmet 130 as shown. In such embodiments of the headphone system 200 and the headphone system 100, the headband 102 may be integrated into the helmet 130, and each support 218 or mechanical linkage may be attached to the helmet 130. The helmet 130 may be particularly helpful for users during transit on the roads, such as while riding a bicycle or motorcycle. The helmet 130 may have a hole 132 through the helmet 130 that is configured to be positioned between the speaker module 104 and the user's ear when the user is wearing the headphone system 200, thus allowing the sound projected by the speaker module 104 to travel through the hole 132. The hole 132 allows for improved hearing for the user by keeping the acoustic path open. In some embodiments, if the hole 132 is not included, there is no open acoustic path from the user's surroundings to the user's ear because of the interference of the helmet 130. In some embodiments, the helmet is a bicycle helmet that does not cover or enclose the user's ear. In such embodiments, the hole 132 is not required to provide an open acoustic path. The support 218 may attach to the helmet 130 and position the speaker module 104 such that the free end 222 and the speaker module 104 are aligned with the line of hearing of the user's ear. As mentioned above, the speaker module 104 may be positioned between 1 cm and 5 cm from the ear.

The adjustable headphone system 100, 200 is designed to be mechanically simple, ergonomic, and cost-effective, reducing the direct sound pressure on the ear to support long-term hearing health. In addition, the adjustable headphone system 100, 200 offers a practical alternative to electronic transparency systems while preserving the familiar form factor of traditional headphones.

Many additional implementations are possible. Further implementations are within the CLAIMS.

It will be understood that implementations of the headphone system include but are not limited to the specific components disclosed herein, as virtually any components consistent with the intended operation of various headphone systems may be utilized. Accordingly, for example, it should be understood that, while the drawings and accompanying text show and describe particular headphone system implementations, any such implementation may comprise any shape, size, style, type, model, version, class, grade, measurement, concentration, material, weight, quantity, and/or the like consistent with the intended operation of headphone systems.

The concepts disclosed herein are not limited to the specific headphone systems shown herein. For example, it is specifically contemplated that the components included in particular headphone systems may be formed of any of many different types of materials or combinations that can readily be formed into shaped objects and that are consistent with the intended operation of headphone systems. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, headphone systems may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular headphone system implementations, it should be readily apparent that a number of modifications may be made without departing from the spirit thereof and that these implementations may be applied to other implementations disclosed or undisclosed. The presently disclosed headphone systems are, therefore, to be considered in all respects as illustrative and not restrictive.

I claim:

1. A headphone system, comprising:

a headband configured to be worn on a head of a user, the headband comprising:

a top portion configured to extend around a crown region of the user's head, the top portion having a first end and a second end opposite the first end; and a first arm extending from the first end and a second arm extending from the second end, the first arm and the second arm together being configured to secure the headband to the user's head;

a first support fixedly attached to the first arm and a second support fixedly attached to the second arm, each support comprising a free end distal to the respective arm; and a first speaker module mounted to the free end of the first support and a second speaker module mounted to the free end of the second support;

wherein, when the headband is worn by the user, each speaker module is in a fixed position spaced apart from the user's head, is positioned to project sound along a directional axis that is aligned with a line of hearing of the user, and is configured to deliver audio to the user along the user's line of hearing while allowing ambient sound to reach the user's ear through an open acoustic path;

wherein, when the headband is worn by the user, each of the first speaker module and the second speaker module is configured to remain fixedly offset from the user's ears.

2. The headphone system of claim 1, wherein each speaker module is spaced between 1 centimeter and 5 centimeters from the user's ear.

3. A headphone system, comprising:

a headband configured to be worn on a head of a user, the headband having a first arm and a second arm opposite the first arm, the first arm and the second arm together being configured to secure the headband to the user's head;

a first support fixedly coupled to the first arm and a second support fixedly coupled to the second arm; and a first speaker module supported by the first support and a second speaker module supported by the second support;

wherein, when the headband is worn by the user, each speaker module is in a fixed position spaced apart from the user's head and is configured to deliver audio to the user along the user's line of hearing while allowing ambient sound to reach the user's ear through an open acoustic path;

wherein, when the headband is worn by the user, each of the first speaker module and the second speaker module is configured to remain offset from the user's ears.

4. The headphone system of claim 3, wherein the first support comprises a free end distal to the first arm and the second support comprises a free end distal to the second arm.

5. The headphone system of claim 4, wherein the first speaker module is positioned on the free end of the first support and the second speaker module is positioned on the free end of the second support.

6. The headphone system of claim 3, wherein each speaker module is positioned to project sound along a directional axis that is substantially aligned with the user's line of hearing.

7. The headphone system of claim 3, wherein each speaker module is spaced between 1 centimeter and 5 centimeters from the user's ear.

8. A headphone system, comprising:

a first support configured to be worn on a head of a user; and a first speaker module positioned on the first support;

wherein, when the first support is worn by the user, the first speaker module is spaced apart from the user's ear and is positioned to project sound along a directional axis that is aligned with a line of hearing of the user; and wherein the first speaker module is configured to deliver audio to the user while allowing ambient sound to reach the user's ear through an open acoustic path;

wherein, when the first support is worn by the user, the first speaker module is configured to remain offset from the user's ear.

9. The headphone system of claim 8, wherein the first speaker module is spaced between 1 centimeter and 5 centimeters from the user's ear.

10. The headphone system of claim 8, further comprising a headband configured to be worn on the head of the user, wherein the first support is attached to the headband.

11. The headphone system of claim 10, wherein the first support comprises a free end distal to the headband.

12. The headphone system of claim 11, wherein the first speaker module is positioned on the free end of the first support.

13. The headphone system of claim 10, wherein the support is fixedly attached to the headband.

14. The headphone system of claim 8, further comprising a second support configured to be worn on the head of the user and a second speaker module positioned on the second support, wherein, when the second support is worn by the user, the second speaker module is spaced apart from the user's ear and is positioned to project sound along a directional axis that is aligned with a line of hearing of the user and wherein the second speaker module is configured to deliver audio to the user while allowing ambient sound to reach the user's ear through an open acoustic path.

* * * * *